July 31, 1956  F. A. TRESTER  2,756,532
FISHING LURES
Filed July 9, 1954

INVENTOR.
FREDERICK A. TRESTER
BY
Gerald P. Welch
ATTORNEY

United States Patent Office 2,756,532
Patented July 31, 1956

2,756,532
FISHING LURES

Frederick A. Trester, Milwaukee, Wis.

Application July 9, 1954, Serial No. 442,402

1 Claim. (Cl. 43—42.05)

This invention relates to improvements in fishing lures and more particularly to a novel fishing lure adapted for combination with the conventional fly lure.

A prime object of the invention is to provide a simple device or adaptor carrying an oscillating attractor which imparts a lively, alluring action to an attached artifical fly as the lure is drawn through the water.

The device can be adapted to a fly fished with the point of the hook disposed in either an upwardly or downwardly directed position. An object of the invention, therefore, is to provide a non-spinning attractor which also serves as a counterweight for the hook if the fly is fished with the hook in point-up position.

Another object of the invention is to provide a device that will produce effective action of the lure when fished at a slow-retrieving speed but will not cause it to revolve, so that in casting it with a fly rod the lure can readily be lifted from the water without placing undue strain on the rod.

Other and further objects of the invention will appear as the description proceeds, reference being had to the accompanying drawing, in which.

Figure 1:
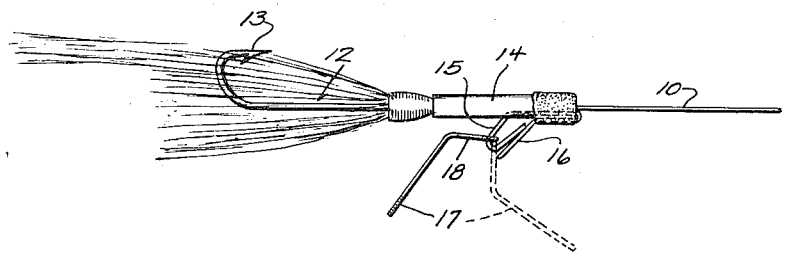
Fig. 1 is a side view in elevation of a fishing lure embodying the invention with the farthest possible forward movement of the attractor indicated in dotted lines.
Figures 2, 3:
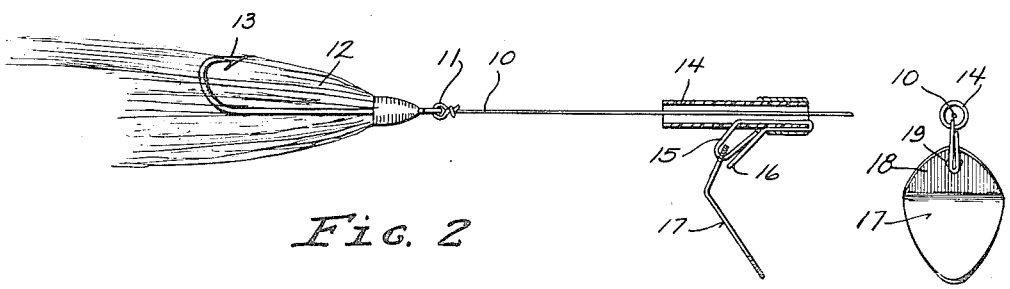
Fig. 2 is a view partly in section and partly in elevation of the device.
Fig. 3 is a detailed view taken from the front of the oscillating attractor.

Referring more particularly to the drawing, the numeral 10 refers to a fish line leader attached by a knot 11 to the fly lure 12 provided with the hook 13.

A resilient plastic tubular element 14, has secured thereto a composite wire structure including a link element 15 and a guard 16. As shown in Fig. 1, the guard 16 is so disposed that it depends at a trailing angle from the tubular element 14, and the link 15 is also inclined rearwardly of the assembly in order to retain for limited oscillating movement the metal attractor 17. The guard 16 prevents frontal displacement of the attractor 17. The attractor 17 is angularly formed, a relatively smaller upper segment 18 having an aperture at 19 to accommodate the link 15.

Figure 4:
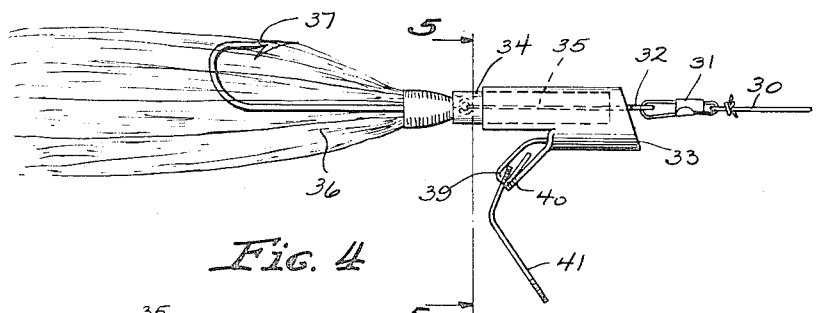
Fig. 4 is a side view in elevation of a modified form of the invention.

In Fig. 4 a modified form of the invention is shown, in which a fish line 30 is attached by a connector snap 31 to the eye 32 which projects from the frontal end 33 of the resilient plastic tubular element 34 which covers the link rod 35 connecting the fly 36 provided with the hook 37 to the snap 31. The tubular element 34 keeps the shank 36a of hook 37 and the link 35 in alignment. A relatively heavy metal shell embraces the tubular element 34 and is provided with a link 39 and the guard 40. An oscillating attractor 41 depends trailingly from the link 39.

Figure 5:
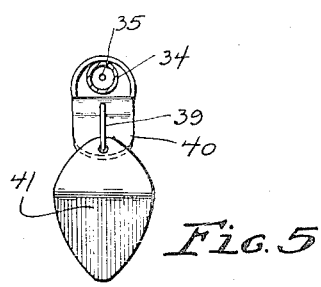
Fig. 5 is a view taken on line 5—5 of Fig. 4.

In use, the tubular element 14 is placed on the leader 10 which latter is tied by the knot 11 to the fly 12. The tubular element 14 and its attached assembly is moved back over the knot 11 and will thus retain the fly 12 and hook 13 in proper alignment. The weight of the attractor 17 will maintain the hook 13 in the selected position, either up or down as preferred. As the lure is drawn slowly through the water the attractor 17 being of metal with a polished surface will oscillate easily from side to side giving the assembly a desirable movement through the water. In the form of the invention illustrated in Figs. 4 and 5, the relatively heavy metal shell will cause the assembly to take a lower level in travel through the water.

It will be understood that the device is capable of many modifications in structure and design, without departing from the spirit of the invention, within the scope of the appended claim.

Having thus described the invention, what is claimed and desired to be secured by Letters Patent of the United States, is:

A device of the character described including an elongated resilient sleeve, a metal shell embracing said sleeve, said shell being provided with an eccentric enlarged and thickened portion on the underside thereof, a link disposed angularly rearwardly on said enlarged portion, an angularly formed attractor blade engaged for oscillation on said link, and a loop guard disposed frontally of said link to limit frontal movement of said attractor blade.

References Cited in the file of this patent

UNITED STATES PATENTS

| | | |
|---|---|---|
| 281,083 | Kessler | July 10, 1883 |
| 481,652 | Loftie | Aug. 30, 1892 |
| 633,797 | Cantrell | Sept. 26, 1899 |
| 1,314,868 | Gray | Sept. 2, 1919 |
| 1,949,983 | Danielczuk | Feb. 27, 1934 |
| 1,997,802 | Meyer | Apr. 16, 1935 |
| 2,502,979 | Moore | Apr. 4, 1950 |
| 2,552,946 | Exley | May 15, 1951 |
| 2,619,761 | Homa | Dec. 2, 1952 |